Aug. 18, 1942.   S. K. BROWN ET AL   2,293,276
TEMPERATURE CONTROLLED INDICATING DEVICE
Filed Aug. 2, 1940

Inventor
Stewart K. Brown and
Wellington B. Sullivan
By Shepherd Campbell
Attorneys Patented Aug. 18, 1942

2,293,276

UNITED STATES PATENT OFFICE 2,293,276

TEMPERATURE CONTROLLED INDICATING DEVICE

Stewart K. Brown, Alexandria, Va., and Wellington B. Sullivan, Silver Spring, Md.

Application August 2, 1940, Serial No. 350,000

17 Claims. (Cl. 116—114)

The device of the present invention is of the general nature of that shown in our copending application, Serial No. 310,260, filed December 20, 1939, of which this application is a continuation in part.

The invention has for its object to provide a very simple and inexpensive device of a nature to be easily and quickly applied to the surfaces of mechanisms which are subject to variations of temperature under conditions of use, the said device serving to indicate when such surface has reached a predetermined temperature.

The device also serves to indicate whether the surface to which it is applied has reached an undesirable temperature since the last inspection of the device, even though such undesirable temperature may not be existing at the moment of a succeeding inspection.

One of the important uses of the device of the present invention is in connection with electric transformers such as are used by electric light and power companies. Most of these transformers contain a body of oil, and it is the present practice to have men test the temperature of the oil in the transformer from time to time to determine whether a given transformer is being overloaded. This requires that the men doing this work climb to positions of considerable elevation to reach the transformers, since the latter are usually upon elevated structures. By the use of the device of the present invention, the condition of the transformer may be determined by a mere visual inspection from the ground, and thus the injuries which have sometimes been caused by men being burned or falling, may be avoided.

The device relies upon permanent magnets as the primary means for holding it in heat-exchange relation to the mechanism to be protected, such as an overhead electrical oil-filled transformer for example. Thus, we are able to avoid the necessity of tapping screw holes into the transformer for the support of the indicators, but upon the contrary, we are able to merely place the indicators upon that part of an individual transformer where it can best be seen from the ground.

The invention further contemplates the provision of means for excluding air from the space between the body of the indicator and the surface to which it is applied, such means also functioning to prevent any tendency of the indicator to "creep" downwardly under the influence of vibration from passing vehicles and the like, when the indicator is applied to a vertical surface.

Further objects and advantages of the invention will be set forth in the detailed description which follows.

In the accompanying drawing.

Like numerals designate corresponding parts in all of the figures of the drawing.

In the particular embodiment of the invention which we have chosen for purposes of illustration, we provide an outer box-like casing 5 of some suitable non-corrosive material. This casing fits over and is secured by a screw 6 to a metallic thermal mass 7. In the particular illustration shown, this mass is made of two pieces, but this is not essential, and it can and probably will be made in one piece.

Figure 3:
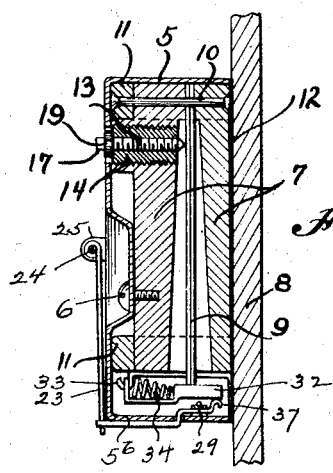
Fig. 3 is a longitudinal vertical sectional view upon line 3—3 of Fig. 1.

The function of the mass 7 is to collect and transmit such a measure of heat from a metallic surface, such as the wall 8 of a transformer (Fig. 3), as to affect and flex a bi-metallic strip 9. This strip is shown in Fig. 3 and is held in place by a rivet 10, which traverses the thermal mass and also traverses the bridge portion 11 of a horseshoe magnet.

There are two of these magnets, one at each end of the structure, and they are permanently magnetized, so that when the whole structure is brought into juxtaposition to the metallic wall 8 the feet 11ª of the magnet will magnetically engage said wall and hold the whole structure in place.

While the inner face of the thermal mass 7 is made as smooth as possible and shaped to conform to the shape of the surface to which it is to be applied, it is found that the external surfaces of the transformers are more or less rough.

Any air gap between the thermal mass and the transformer wall, even though it be a very small one, interferes with the proper heat exchange between the transformer and the thermal mass. This is especially true in cold and windy weather. To destroy any such air gap, and to facilitate the efficient transmission of heat, we prefer to apply a body of plastic material 12 between the mass 7 and the wall 8. This material is of a nature to retain its plasticity or flexibility over a relatively long period of time, and it serves not only to destroy the air gap, but in addition, to prevent any tendency of the structure to "creep" downwardly under the influence of vibration imparted to the transformer by passing trucks, trains, etc.

The degree to which the free end of the bimetallic strip 9 may be flexed by a given degree of heat, is determined by the pressure exerted upon said bimetallic strip by an adjusting screw 13. This screw is threaded into a sleeve 14. Sleeve 14 is threaded into the thermal mass 7. Adjustment of the sleeve 14 inwardly or outwardly gives a primary setting of the structure, this primary setting being preferably effected at the factory.

Figure 4:
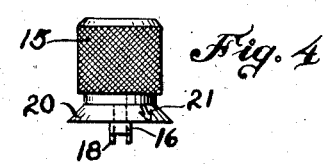
Fig. 4 is a detailed view of a setting tool or wrench used for setting the mechanism to trip at a desired point.

A secondary setting may be effected by the turning of screw 13 through the medium of a tool or wrench 15, such as is illustrated in Fig. 4. When this tool is used, the tubular stem 16 of the tool fits over the head 17 of the screw, and the lugs 18 of the tool engage in the notches 19 of a collar carried by the screw. The flange 20 of the tool is provided with an indicating marker or arrow 21 carried by the tool which coacts with a graduated scale 22 formed upon the outer face of the case 5. The arrow could be formed upon the case and the scale upon the tool without departure from the invention.

Thus, sleeve 14 gives a coarse initial setting at the factory, which cannot thereafter be disturbed because the casing will then cover the sleeve. The screw 13 gives a fine and determinable setting so that an inspector may set the structure to trip at that point indicated to be desirable by the conditions existing at the transformer to which the indicator is to be applied.

The signal or indicator proper consists of a flip plate 23 that is hingedly mounted upon a transverse shaft 24, supported in ears 25. A spring 26 tends to flip this plate upwardly to the position illustrated in Fig. 2. The outer lower portion of the casing 5 is of some distinctive color, such as red, as at 5ª, and the inner face of the plate 23, in Fig. 1, is of the same color.

Figure 2:
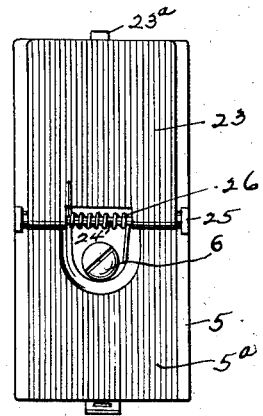
Fig. 2 is a front elevation showing the indicator as it appears after it has been tripped by a rise of temperature.

Thus when the signal has been tripped and the plate has been thrown to the position illustrated in Fig. 2, it will, as a whole, present a distinctive color which may be seen from a considerable distance, such, for example, as by a person standing upon the ground beneath an overhead transformer to which the indicator is applied.

The plate 23 carries a tongue 23ª, adapted to engage in an opening 27 of a trigger plate 28. This trigger plate has a leaf spring 29, secured thereto which bears against the end wall 5ᵇ of the casing. This end wall has an opening 30 formed therethrough, through which a bent portion 31 of the trigger plate passes and in which this trigger plate may have a limited rocking movement.

Figure 1:
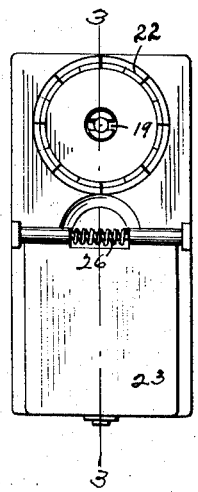
Fig. 1 is a front elevation of the indicator showing it as it appears when set and ready for action.
Figure 5:
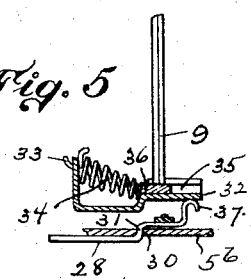
Fig. 5 is an enlarged fragmentary vertical sectional view through the lower end of the structure.
Figure 6:
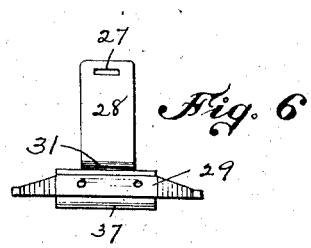
Fig. 6 is a detail face view of the trigger plate hereinafter described.
Figure 7:
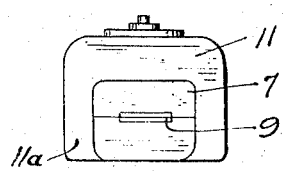
Fig. 7 is a top plan view of the structure with the outer casing removed, showing the upper permanent magnet and its embraced thermal metallic mass.

In the position illustrated in Figs. 1, 3 and 5, the tongue 23ª is engaged by the trigger plate, and the flip plate 23 is held down against the action of spring 26. At this time, the trigger plate cannot move to release tongue 23ª because of the presence of a swinging abutment 32, against which the end of the bimetallic strip 9 bears. This abutment 32 is hung to swing upon a hook-like member 33, secured to the mass 7, and a spring 34 tends to move the free end of the abutment away from the end of the bimetallic strip.

By referring to Fig. 5 it will be seen that the abutment is thicker at that part which lies in front of the end of the bimetallic strip than it is at its outer end, due to the presence of a cavity 35, formed in the abutment adjacent the outer end thereof. The bimetallic strip 9 is of such construction that rise of temperature causes it to flex in such direction that its free end moves toward the cavity 35.

Thus, when the end of the strip 9 moves off of the filling block 36, which forms a part of the abutment, and moves into alignment with cavity 35, the tail 37 of the trigger plate 28 may move away from the end wall of the casing 5 under the influence of the spring 29, pushing the abutment away from the end wall 5ᵇ. This in turn moves the left-hand end of the trigger plate 28 away from the outer face of the end wall 5ᵇ of the casing 5 and consequently frees the tongue 23ª of the flip plate. The flip plate thereupon flips up into the position illustrated in Fig. 2.

When the device is to be re-set, and an inspector restores the flip plate 23 and trigger plate 28 to the position illustrated in Fig. 1, the spring 34 causes the abutment to move away from bimetallic strip 9 and toward the tail 37 of the trigger plate, thus permitting the now cooled bimetallic strip to move back again to the position illustrated in Fig. 5.

The plastic material 12 may be of any suitable nature. We have found the ordinary caulking compounds such as are used in caulking windows of buildings, to be suitable. In the manufacture of the magnets, we employ an alloy having a high degree of efficiency for the purpose intended. To be suitable for the use proposed, the magnets must be very strong in proportion to their size, and they must retain their magnetism over a long period of time. We find an alloy of nickel, aluminum and cobalt to be suitable. It should be remembered that these magnets have to support not only their own weight, but they have to support the rather considerable weight of the thermal mass. This mass, in turn, must in reality be a mass in the sense of presenting considerable volume. It is not desirable to have a signal of this character respond to a mere momentary increase of temperature. In order to make the device responsive to a reasonably sustained rise in temperature and to render it possible to build up the required degree of heat to flex the bimetallic strip, the rather considerable thermal mass 7 is employed. In addition, the horseshoe magnets 11 aid in storing heat along with the thermal mass since they are of metal and embrace and are in close association with said mass.

It is to be understood that the invention is not limited to the precise constructions set forth, but that it includes within its purview whatever changes fairly come within either the terms or the spirit of the appended claims.

Having described our invention, what we claim is:

1. The combination with a thermal mass of considerable volume, shaped and dimensioned to lie in face to face contact with a heated metallic surface, the heat of which is to be indicated, of a body of plastic material between the thermal mass and said surface, a cavity within the thermal mass, a bimetallic strip secured at one end to said thermal mass and extending lengthwise through said cavity, said cavity being of such amplitude as to permit flexing movement of the bimetallic strip under the influence of heat stored up by said mass, one end of said bimetallic strip projecting beyond the end of the thermal mass, a signal supported upon the thermal mass, spring means tending to move the signal to indicating position, and means restrained by engagement with the bimetallic strip for preventing movement of the signal under the influence of its spring means.

2. A structure as recited in claim 1 in combination with permanent magnets carried by the thermal mass and functioning to draw the same toward the heated metallic surface.

3. A device of the character described, comprising an elongated thermal mass, a cover for the same, said mass having an internal cavity extending throughout the major portion of its length, a bimetallic strip secured at one end to said mass and projecting lengthwise through said cavity and extending beyond the mass at the other end of said cavity, a flip plate upon the cover, spring means tending to move the flip plate, a trigger plate restraining the flip plate and a movable abutment adapted to bear between the end of the bimetallic strip and the trigger plate, said abutment being constructed to prevent movement of the trigger plate when the bimetallic strip is in unflexed position and to permit movement of the trigger plate when the bimetallic strip is in flexed position.

4. A structure as recited in claim 3, in combination with a pair of permanent magnets one at each end of said mass and functioning to hold the mass magnetically upon a metallic surface.

5. A structure as recited in claim 3 in combination with a pair of permanent magnets, one at each end of said mass and functioning to hold the mass magnetically upon a metallic surface, and a body of plastic filling material between the mass and the surface, against which the mass is held by said magnets.

6. A structure as recited in claim 3 in combination with an adjusting screw carried by said mass and bearing upon the bimetallic strip adjacent the inner end of said cavity.

7. A signal of the character described comprising an elongated block constituting a thermal mass having an internal cavity extending substantially the full length thereof, a bimetallic strip secured to said mass adjacent one end thereof and projecting through said cavity and beyond the opposite end of said cavity, a swingingly mounted abutment adjacent the free end of the bimetallic strip, said abutment comprising a relatively thick portion which lies in front of the end of said strip when said strip is unflexed, said abutment being provided with a recess, into alignment with which said strip moves when it is flexed to thereby permit movement of the abutment toward the free end of the strip, a flip plate, a trigger plate engaging the flip plate, spring means tending to move the trigger plate to releasing position, said trigger plate being provided with a member adapted to engage the abutment to hold the trigger plate in flip plate-engaging position as long as the bimetallic strip is unflexed to a pre-determined degree.

8. A structure as recited in claim 7, in combination with a screw carried by the thermal mass and bearing upon the bimetallic strip adjacent its point of attachment with the thermal mass.

9. A device of the character described, comprising a thermal mass, means for holding said mass in engagement with the surface of a heated metallic element, the temperature of which is to be measured, a sleeve threaded into the thermal mass, an adjusting screw threaded into said sleeve, a bimetallic strip secured to the thermal mass adjacent said screw and extending throughout the length of said mass through an internal cavity formed therein, a signal, means for controlling said signal under the influence of the position of the free end of the bimetallic strip, a sheet metal casing adapted to fit over said mass and provided with an opening for the passage of said screw said opening being of such diameter that the casing covers the sleeve but not the screw, whereby the screw may be adjusted from the exterior of the casing while the sleeve may not, a manipulating tool for the screw, and a graduated scale upon the face of the casing, said tool being provided with an indicating mark to cooperate with said scale.

10. In a signal of the character described, the combination with a thermal mass and a contained bimetallic strip, of a casing adapted to fit over and to be secured to said mass, a spring actuated flip plate, pivotally mounted upon said casing and having a tongue which projects beyond the end of said casing, a trigger plate passing through the end wall of the casing and comprising a part which lies outside of the end wall of the casing and a part which lies inside of the end wall of the casing, that part which lies outside being provided with means to engage and restrain the tongue of the flip plate, and that part which lies inside of the casing being spring actuated away from the end wall of the casing, a movably mounted abutment comprising a relatively thick part which lies in alignment with the end of the bimetallic strip when the latter is unflexed and a thinner part which lies in alignment with the bimetallic strip when the latter is flexed, whereby when the bimetallic strip is flexed, the abutment may move toward the end of said strip under the influence of that part of the trigger plate which lies inside of the end wall of the casing, to thereby release the tongue of the flip plate and permit it to flip to indicating position.

11. A structure as recited in claim 10, in combination with spring means tending to move the abutment toward the trigger plate.

12. A structure as recited in claim 10, in combination with a pair of permanent horseshoe shaped magnets embracing the thermal mass within the casing and having their ends disposed to magnetically engage a heated metallic member, the heat of which is to be indicated and to hold the thermal mass and associated parts in position thereon.

13. A thermal indicator comprising a thermal mass, a heat actuated member mounted upon said mass, a signal controlled by the movement of said member, a heated metallic surface, a permanently magnetized member associated with the thermal mass, of such nature and strength as to support the indicator by magnetic attraction alone in contact with the heated metallic surface, the temperature of which is to be indicated by said signal and a body of plastic material disposed between said heated metallic surface and the thermal mass and functioning to facilitate heat exchange between the heated surface and the thermal mass and to physically resist creeping of the indicator with respect to said heated surface when the latter is under vibration.

14. In a device of the character described, the combination with a metallic mass of such considerable volume as to constitute a heat storing and transmitting body, of a signal associated with said mass, said signal comprising a movable indicating element and a temperature controlled detent means normally restraining movement of said element, said detent being actuated to releasing position under changes of temperature of a predetermined extent and being disposed in heat exchange relation to said mass, and permanently magnetized metallic areas associated with said thermal mass of said strength of magnetization as to support the mass and signal in place against the face of a substantially vertical metallic surface.

15. An indicating signal comprising a thermal mass having magnetic means associated therewith for holding said mass by magnetic means alone in heat exchange relation to and upon a heated metallic surface, a signal, means tending to move said signal in one direction, a detent means including a bimetallic strip preventing such movement of the signal, an adjusting means for the bimetallic strip providing for an initial coarse adjustment and a final fine adjustment and comprising a sleeve threaded into said mass and a screw threaded into said sleeve, an enclosing casing overlying the sleeve and preventing movement thereof after said sleeve has been placed in position, said casing being provided with an opening through which the screw is accessible.

16. An indicating signal comprising a thermal mass having magnetic means associated therewith for holding said mass by magnetic means alone in heat exchange relation to and upon a heated metallic surface, a signal, means tending to move said signal in one direction, a detent means including a bimetallic strip preventing such movement of the signal, an adjusting means for the bimetallic strip providing for an initial coarse adjustment and a final fine adjustment and comprising a sleeve threaded into said mass and a screw threaded into said sleeve, an enclosing casing overlying the sleeve and preventing movement thereof after said sleeve has been placed in position, said casing being provided with an opening through which the screw is accessible, a tool shaped to engage and turn said screw and cooperating indicating means upon the tool and casing by which the extent of turning movement of the screw may be determined in the making of the fine adjustment.

17. An indicating signal comprising a thermal mass having magnetic means associated therewith for holding said mass by magnetic means alone in heat exchange relation to and upon a heated metallic surface, a signal comprising a control element in heat exchange relation to said mass, means for effecting a coarse and a fine adjustment of the control element, consisting of a sleeve threaded into the thermal mass, a screw threaded into the sleeve and bearing upon the control element, a manually operable tool for rotating the screw with respect to the sleeve and indicating means for indicating the extent of the turning movement of the tool and consequently the extent of the adjustment.

STEWART K. BROWN.
WELLINGTON B. SULLIVAN.